US012707347B2

(12) United States Patent
Biton et al.

(10) Patent No.: US 12,707,347 B2
(45) Date of Patent: Aug. 11, 2026

(54) O-RAN COMPATIBLE DEPLOYMENT ARCHITECTURE

(71) Applicant: Parallel Wireless, Inc., Nashua, NH (US)

(72) Inventors: Erez Biton, Herzlia (IL); David Khemelevsky, Kfar Sava (IL)

(73) Assignee: Parallel Wireless, Inc., Nashua, NH (US)

( * ) Notice: Subject to any disclaimer, the term of this patent is extended or adjusted under 35 U.S.C. 154(b) by 416 days.

(21) Appl. No.: 18/174,580

(22) Filed: Feb. 24, 2023

(65) Prior Publication Data

US 2023/0269633 A1 Aug. 24, 2023

Related U.S. Application Data

(60) Provisional application No. 63/268,458, filed on Feb. 24, 2022.

(51) Int. Cl.
*H04W 36/00* (2009.01)
*H04W 88/10* (2009.01)

(52) U.S. Cl.
CPC ........ *H04W 36/0072* (2013.01); *H04W 88/10* (2013.01)

(58) Field of Classification Search
CPC . H04W 36/0072; H04W 88/10; H04W 36/22; H04W 88/085; H04W 24/02; H04W 88/16; H04W 84/18; H04W 84/042; H04W 92/045; H04W 16/18; H04W 28/0268; H04W 76/12; H04W 24/04; H04W 28/0284; H04W 76/15; H04W 88/18; H04W 92/02; H04W 88/06; H04W 16/10; H04W 40/02; H04W 92/14; H04W 88/14; H04W 16/24; H04W 28/16; H04W 76/16; H04W 48/06; H04W 36/035; H04W 36/00224; H04W 72/04; H04W 60/00; H04W 84/02; H04W 16/26; H04W 28/08; H04W 36/00698; H04L 47/18; H04L 65/1016; H04L 12/4633; H04L 63/0272;

(Continued)

(56) References Cited

U.S. PATENT DOCUMENTS

| | | | | |
|---|---|---|---|---|
| 8,879,416 B2 * | 11/2014 | Mishra | .................. | H04W 16/14 709/225 |
| 2019/0289497 A1 * | 9/2019 | Rajagopal | ............ | H04B 7/0456 |

(Continued)

OTHER PUBLICATIONS

"Open RAN explained: Openness, innovation and flexibiity", https://web.archive.org/web/20220108160411/https://www.ericsson.com/en/openness-innovation/open-ran-explained. Downloaded Jan. 8, 2022 by the Internet Wayback Machine.

*Primary Examiner* — Nimesh Patel

(74) *Attorney, Agent, or Firm* — Michael Y. Saji; Ashish Patel

(57) ABSTRACT

A multi-radio access technology (multi-RAT) remote radio head (RRH) is disclosed, comprising: a first functional radio unit (RU) providing RF and Low PHY functions for a first RAT; a second functional radio unit (RU) providing RF functions for a second RAT; and a shared radio fronthaul interface in communication with a virtual baseband unit (VBBU) for the first RAT and the second RAT, The first functional RU and the second functional RU use the shared radio fronthaul interface to send partially processed radio data to the VBBU.

15 Claims, 9 Drawing Sheets

(58) Field of Classification Search
CPC ....... H04L 5/0007; H04L 9/30; H04L 47/125; H04L 61/2514; H04L 49/70; H04L 61/2535; H04L 12/2832; H04L 25/03165; H04L 41/0895; H04L 41/0894; Y02D 30/70; H04B 7/0413; H04B 7/0617; H04B 7/14; H04B 17/318; H04B 7/022; H04B 10/25753; H04B 7/024
See application file for complete search history.

(56) References Cited

U.S. PATENT DOCUMENTS

| | | | | |
|---|---|---|---|---|
| 2020/0128414 | A1 | 4/2020 | Mishra et al. | |
| 2021/0045193 | A1* | 2/2021 | Mishra | H04W 88/12 |
| 2023/0083011 | A1* | 3/2023 | Krishnan | H04W 24/00<br>455/423 |
| 2024/0276301 | A1* | 8/2024 | Zhu | H04L 61/2514 |

* cited by examiner

400

O-RAN COMPATIBLE DEPLOYMENT ARCHITECTURE

CROSS-REFERENCE TO RELATED APPLICATIONS

The present application claims priority under 35 U.S.C. § 119(e) to U.S. Provisional Pat. App. No. 63/268,458, titled "0-RAN Compatible Deployment Architecture" and filed Feb. 24, 2022, which is hereby incorporated by reference in its entirety for all purposes.

This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; US20170257133A1; and US20200128414A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1, US20200128414A1, US20230019380A1 in their entirety. Features and characteristics of and pertaining to the systems and methods described in the present disclosure, including details of the multi-RAT nodes and the gateway described herein, are provided in the documents incorporated by reference.

BACKGROUND

Open Radio Access Network (Open RAN) is a movement in wireless telecommunications to disaggregate hardware and software and to create open interfaces between them. Open RAN also disaggregates RAN from into components like RRH (Remote Radio Head), DU (Distributed Unit), CU (Centralized Unit), Near-RT (Real-Time) and Non-RT (Real-Time) RIC (RAN Intelligence Controller). Open RAN has published specifications for the 4G and 5G radio access technologies (RATs).

SUMMARY

In a first embodiment, a multi-radio access technology (multi-RAT) remote radio head (RRH) is disclosed, comprising: a first functional radio unit (RU) providing RF and Low PHY functions for a first RAT; a second functional radio unit (RU) providing RF functions for a second RAT; and a shared radio fronthaul interface in communication with a virtual baseband unit (VBBU) for the first RAT and the second RAT, The first functional RU and the second functional RU use the shared radio fronthaul interface to send partially processed radio data to the VBBU.

The first RAT may be 4G or 5G, and The radio fronthaul interface may be Common Public Radio Interface (CPRI) or Enhanced Common Public Radio Interface (eCPRI). The second RAT may be 2G or 3G, and The radio fronthaul interface may be Common Public Radio Interface (CPRI) or Enhanced Common Public Radio Interface (eCPRI). The first and the second functional RU may be colocated on a single physical device and virtualized to operate as separate processes. The first and the second functional RU may be instantiated as virtualized containers.

In a second embodiment, a network architecture with multi-radio access technology (multi-RAT) coordination is disclosed, comprising: a multi-RAT remote radio head (RRH) supporting at least two of 2G, 3G, 4G, and 5G; a multi-RAT functional distributed unit (DU) in communication with the multi-RAT RRH; a multi-RAT near-real time (near-RT) radio access network (RAN) intelligent controller (MC) coupled to the functional DU; and a multi-RAT non-real time (non-RT) radio access network (RAN) intelligent controller (MC) coupled to the near-RT RIC.

The multi-RAT non-RT MC may be coupled to a network operator service management and orchestration (SMO) functionality. The method may further comprise a multi-RAT central unit control plane (CU-CP) and multi-RAT central unit user plane (CU-UP).

DETAILED DESCRIPTION

Figure 1:
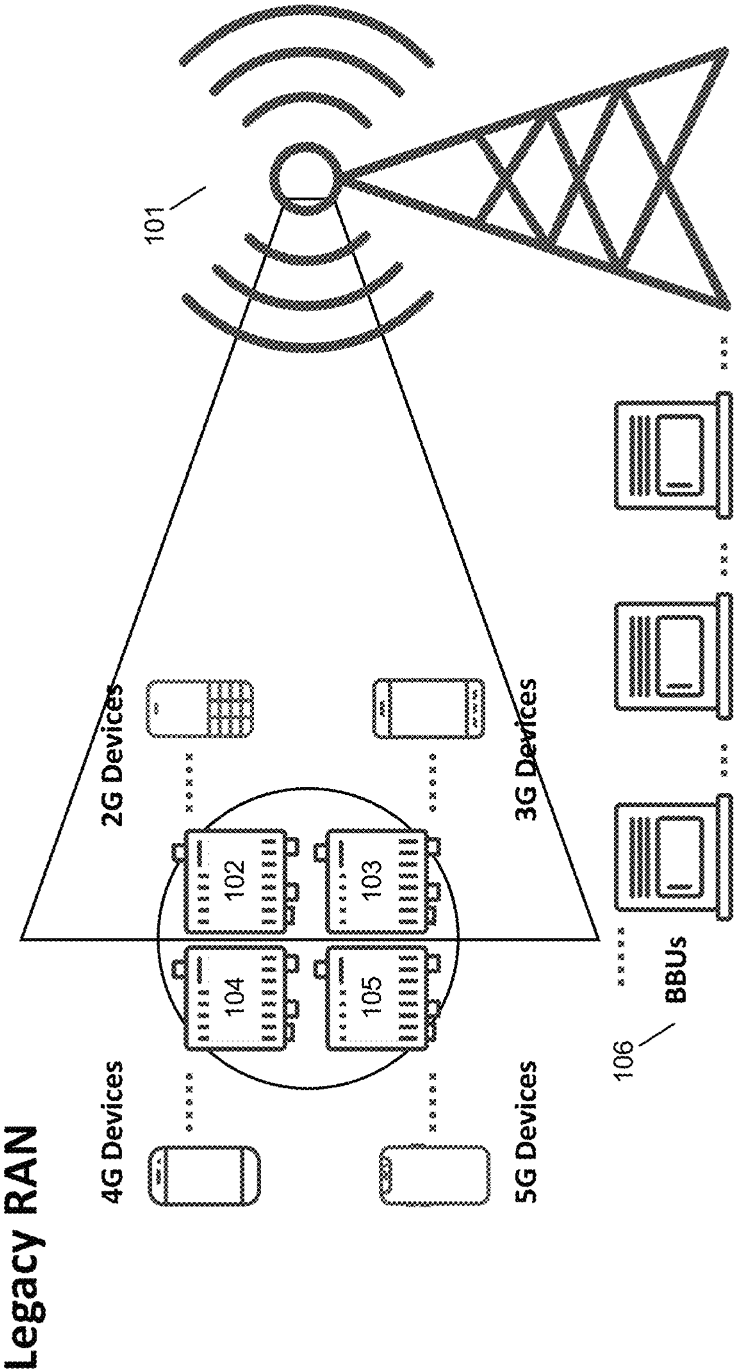
FIG. 1 is a schematic diagram of a legacy RAN deployment architecture, as known in the prior art.

FIG. 1 is a schematic diagram of a legacy RAN deployment architecture, as known in the prior art. Radio tower 101 is used for co-locating a 2G base station 102, 3G base station 103, 4G base station 104, and 5G base station 105, each individual RAT base station having its own radio(s) and processing. To support and enable the radios to perform their necessary functions, including PHY, MAC, backhaul, RRC, etc., several base band units (BBUs) 106 are typically located at the base of the tower and are connected to the individual RAT base stations using a physical cable. This cable itself introduces signal loss and heat/power wastage. The BBUs themselves are expensive to purchase and deploy to the site, are expensive to operate given their need for real estate, HVAC and electrical support, and are expensive also to maintain, as a typical maintenance activity requires a dedicated truck roll to the site with a skilled technician.

Radio Unit Functional Splits

Figure 2:
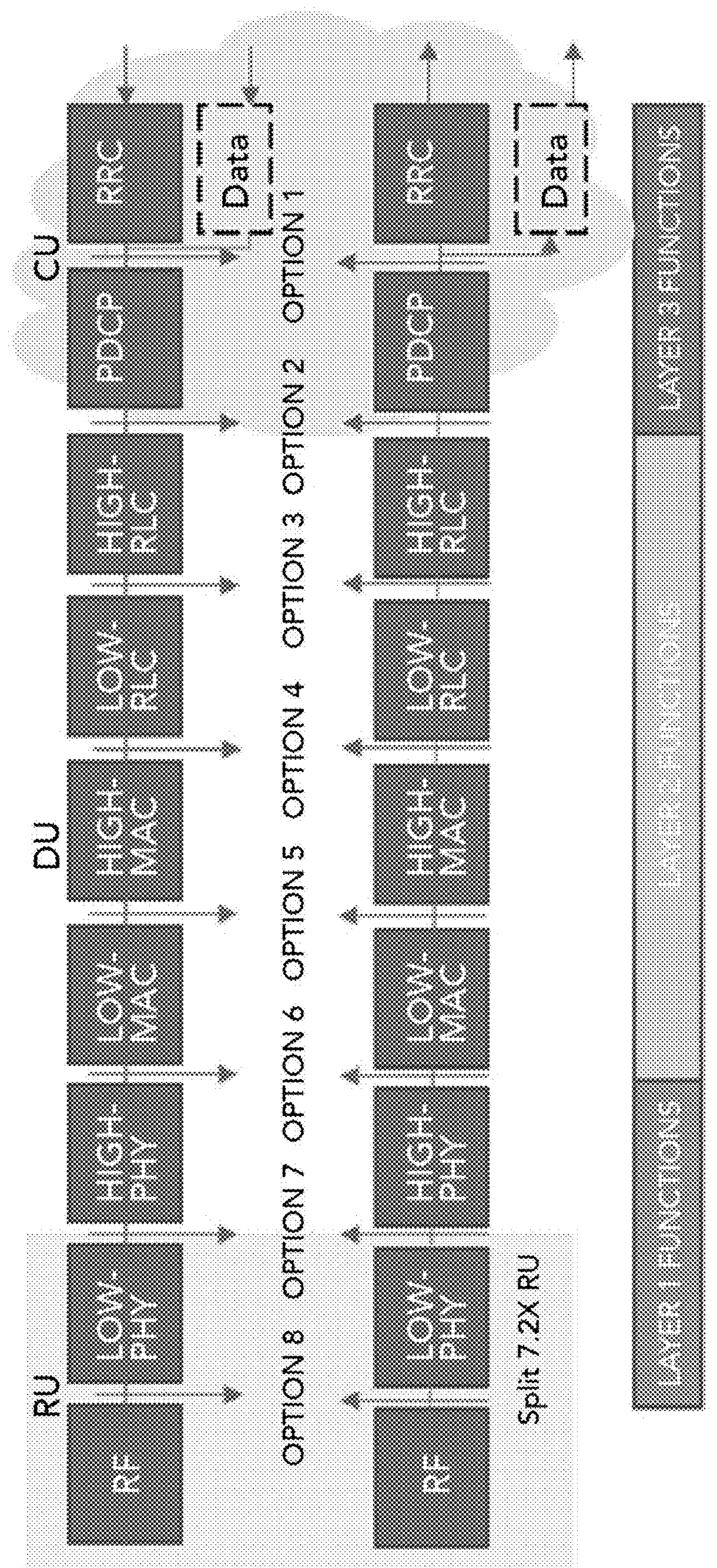
FIG. 2 is a schematic diagram of 3GPP functional splits, as known in the prior art.

FIG. 2 shows a schematic diagram of radio functional splits showing split 7.2× RU as well as other splits. The use of these functional splits is encouraged by ORAN.

5G New Radio (NR) was designed to allow for disaggregating the baseband unit (BBU) by breaking off functions beyond the Radio Unit (RU) into Distributed Units (DUs) and Centralized Units (CUs), which is called a functional split architecture. This concept has been extended to 4G as well.

RU: This is the radio hardware unit that coverts radio signals sent to and from the antenna into a digital signal for transmission over packet networks. It handles the digital front end (DFE) and the lower PHY layer, as well as the digital beamforming functionality. 5G RU designs are supposed to be inherently intelligent, but the key considerations of RU design are size, weight, and power consumption. Deployed on site.

DU: The distributed unit software that is deployed on site on a COTS server. DU software is normally deployed close to the RU on site and it runs the RLC, MAC, and parts of the PHY layer. This logical node includes a subset of the eNodeB (eNB)/gNodeB (gNB) functions, depending on the functional split option, and its operation is controlled by the CU.

CU: The centralized unit software that runs the Radio Resource Control (RRC) and Packet Data Convergence Protocol (PDCP) layers. The gNB consists of a CU and one DU connected to the CU via Fs-C and Fs-U interfaces for CP and UP respectively. A CU with multiple DUs will support multiple gNBs. The split architecture lets a 5G network utilize different distributions of protocol stacks between CU and DUs depending on midhaul availability and network design. It is a logical node that includes the gNB functions like transfer of user data, mobility control, RAN sharing (MORAN), positioning, session management etc., except for functions that are allocated exclusively to the DU. The CU controls the operation of several DUs over the midhaul interface. CU software can be co-located with DU software on the same server on site.

When the RAN functional split architecture (FIG. 4) is fully virtualized, CU and DU functions runs as virtual software functions on standard commercial off-the-shelf (COTS) hardware and be deployed in any RAN tiered datacenter, limited by bandwidth and latency constraints.

Option 7.2 (shown) is the functional split chosen by the O-RAN Alliance for 4G and 5G. It is a low-level split for ultra-reliable low-latency communication (URLLC) and near-edge deployment. RU and DU are connected by the eCPRI interface with a latency of ~100 microseconds. In O-RAN terminology, RU is denoted as O-RU and DU is denoted as O-DU. Further information is available in US20200128414A1, hereby incorporated by reference in its entirety.

Figure 3:
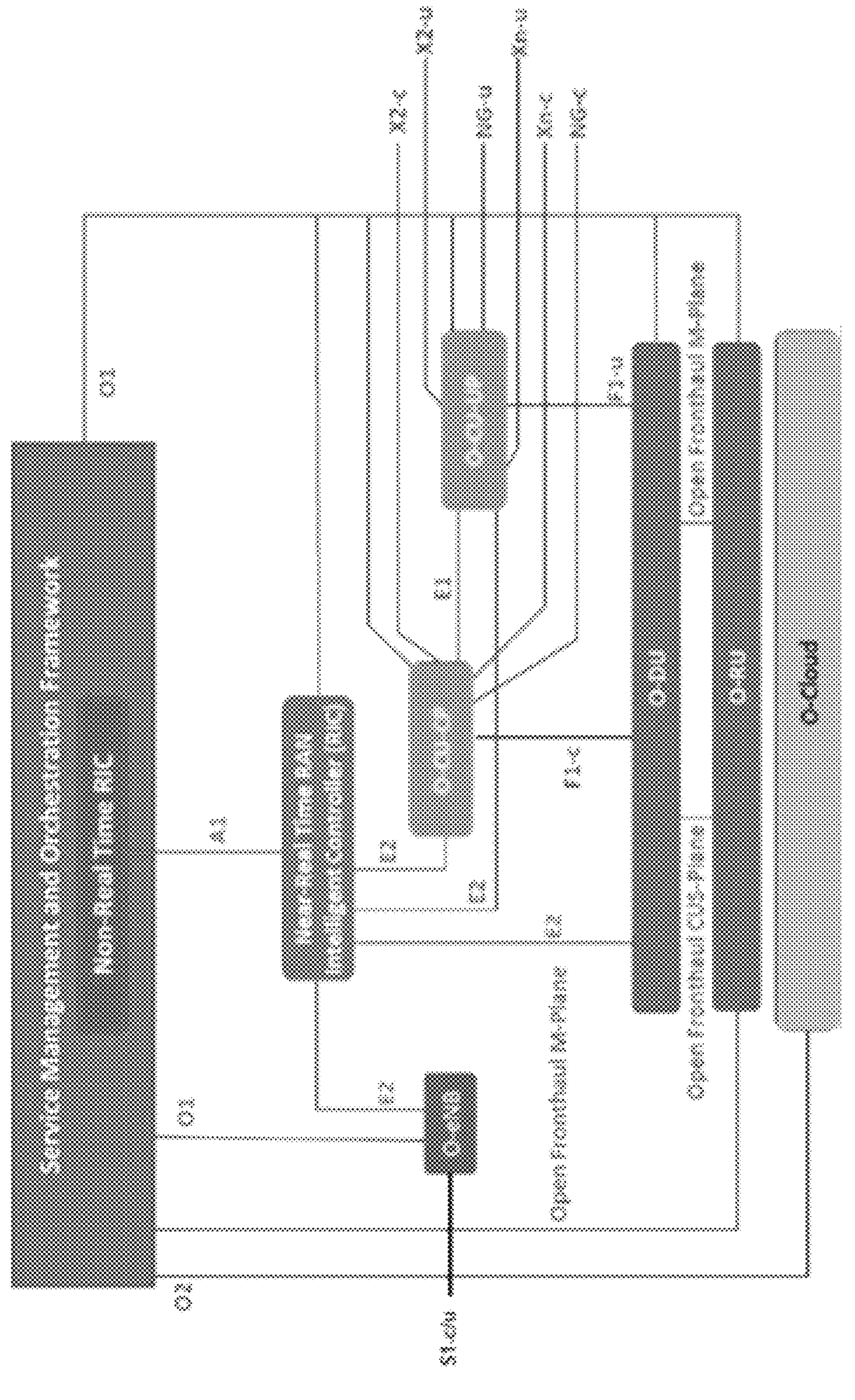
FIG. 3 is a schematic diagram of an Open RAN 4G/5G deployment architecture, as known in the prior art.

FIG. 3 is a schematic diagram of an Open RAN 4G/5G deployment architecture, as known in the prior art. The O-RAN deployment architecture includes an O-DU and O-RU, as described above with respect to FIG. 2, which together comprise a 5G base station in the diagram as shown. The O-CU-CP (central unit control plane) and O-CU-UP (central unit user plane) are ORAN-aware 5G core network nodes. An ORAN-aware LTE node, O-eNB, is also shown. As well, a near-real time RAN intelligent controller is shown, in communication with the CU-UP, CU-CP, and DU, performing near-real time coordination As well, a non-real time RAN intelligent controller is shown, receiving inputs from throughout the network and specifically from the near-RT RIC and performing service management and orchestration (SMO), in coordination with the operator's network (not shown). Absent from the ORAN network concept is any integration of 2G, 3G. Also absent is any integration of a 2G/3G/4G DU or RU.

Figure 4:
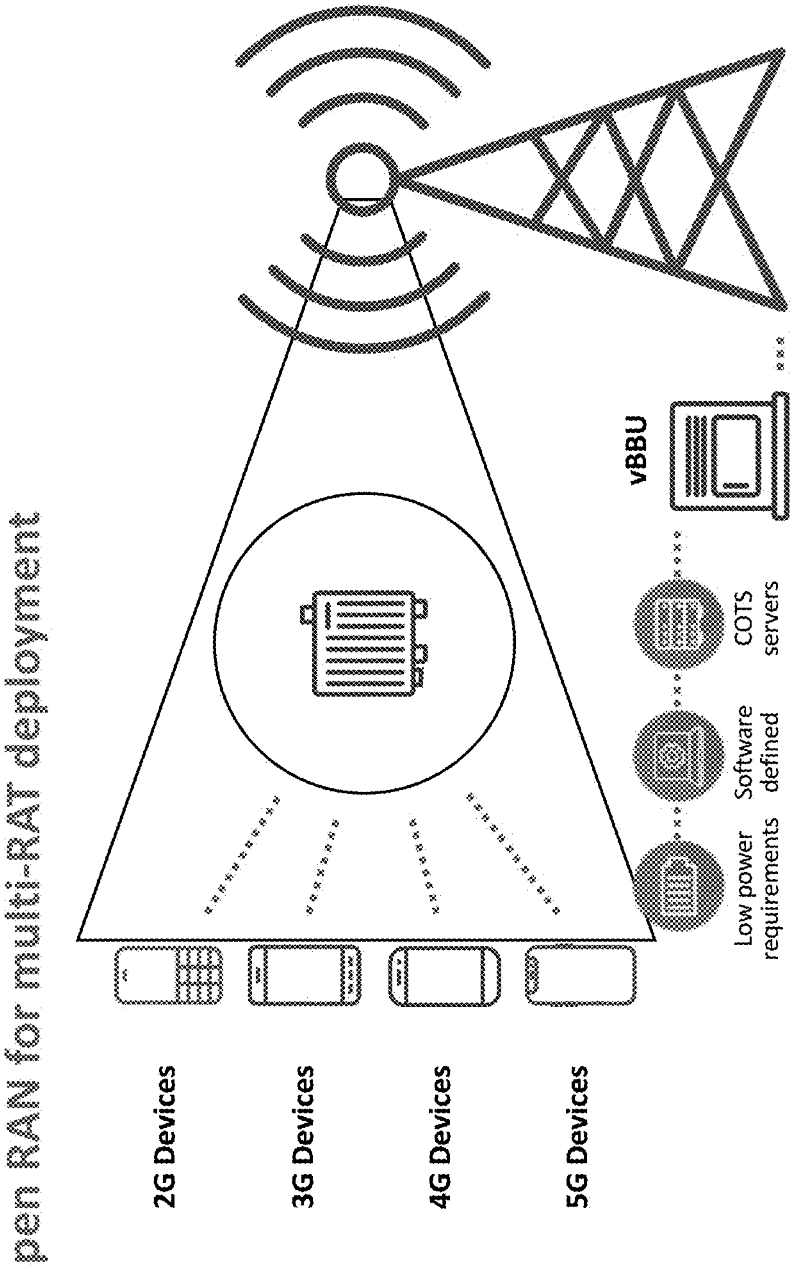
FIG. 4 is a first schematic diagram of a multi-RAT RAN deployment architecture, in accordance with some embodiments.

FIG. 4 is a first schematic diagram of a multi-RAT RAN deployment architecture, in accordance with some embodiments. FIG. 4 shows a radio tower with a remote radio head (RRH) supporting multiple RATs, 2G/3G/4G/5G, but without requiring four generations of radio base stations as shown in FIG. 1. Instead, one or more software-upgradable, remotely configurable base stations is coupled to radio heads and filters that are able to operate on the appropriate frequencies for 2G, 3G, 4G, and 5G RATs. The multiple BBUs located at the bottom of the tower in FIG. 1 have been replaced with one or more vBBUs, baseband units that are rearchitected to use modern virtualization technologies. FIG. 4 can be enabled using a technology like CPRI or eCPRI, which enables digitization and transfer of radio I/Q samples for further processing at a BBU or vBBU.

Where virtualization is described herein, one having skill in the cloud technology arts would understand that a variety of technologies could be used to provide virtualization, including one or more of the following: containers, Kubernetes, Docker, hypervisors, virtual machines, hardware virtualization, microservices, AWS, Azure, etc. In a preferred embodiment, containerized microservices coordinated using Kubernetes are used to provide baseband processing for multiple RATs as deployed on the tower.

The inventors have appreciated that the use of the 3GPP model for functional splits is flexible and may be used to provide deployment flexibility for multiple RATs, not just 5G. Functional splits can be used in conjunction with cloud and virtualization technology to perform virtualization of, e.g., the RU, DU, and CU of not just 5G but also 4G, 3G, 2G, etc. This enables the use of commodity off-the-shelf servers, software-defined networking that can be rapidly upgraded remotely, and lower power requirements by using modern hardware compared to legacy hardware.

Figure 5:
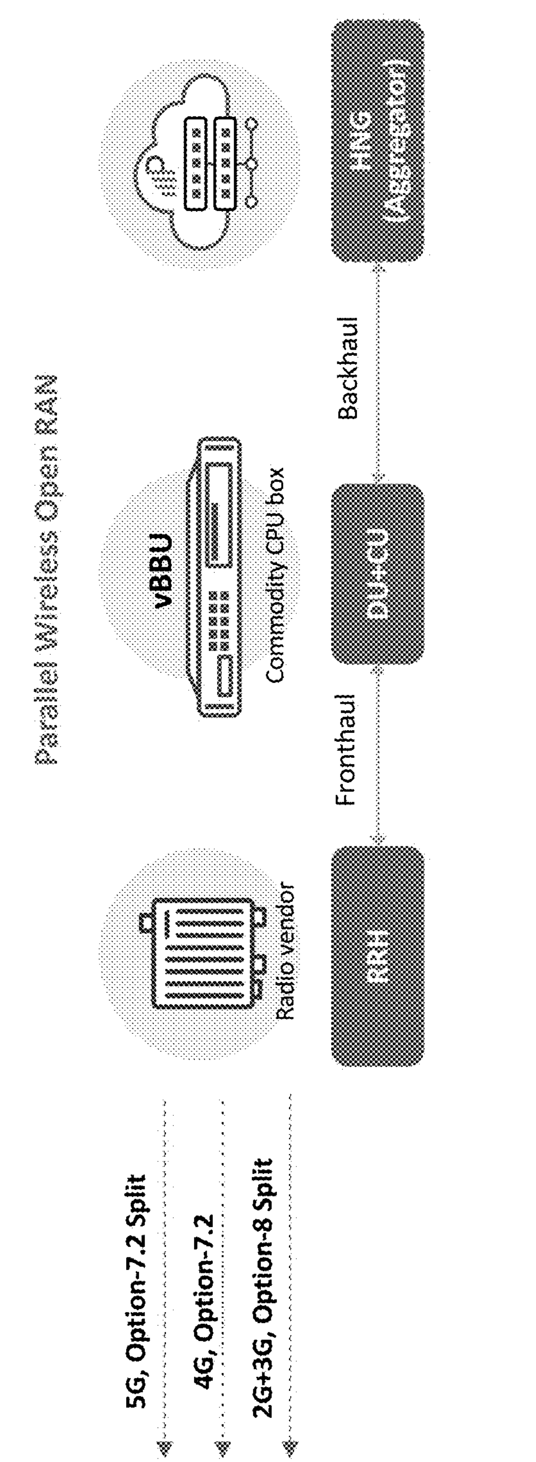
FIG. 5 is a second schematic diagram of a multi-RAT RAN deployment architecture, in accordance with some embodiments.

FIG. 5 is a second schematic diagram of a multi-RAT RAN deployment architecture, in accordance with some embodiments. As shown, a single RRH supports a 5G RAT with an Option 7.2 split, a 4G RAT with an Option 7.2 split, and 2G+3G with an Option 8 split. With the Option 7.2 split, the PHY is split into High PHY and Low PHY. For option 7-2, the uplink (UL), CP removal, fast Fourier transform (FFT), digital beamforming (if applicable), and prefiltering (for PRACH (Physical Random Access Channel) only) functions all occur in the RU. The rest of the PHY is processed in the DU. For the downlink (DL), the inverse FFT (iFFT), CP addition, precoding functions, and digital beamforming (if applicable) occur in the RU, and the rest of the PHY processing happens in the DU. This is the preferred ORAN split for 5G, and can also be used for 4G. For 2G+3G, an Option 8 split is preferred, where only RF will be performed at the RU and further processing (PHY/MAC/RLC/PDCP) is performed at the vBBU. This is desirable because the processing and latency requirements for 2G and 3G are lower, and are readily fulfilled by a BBU or VBBU.

Continuing with FIG. 5, a fronthaul link connects the RRH to a DU+CU, which runs a variety of virtualized RAT processing on a vBBU machine. The fronthaul link may be CPRI or eCPRI, or another similar interface. The DU+CU may be located at the base of the tower or at a further remove as enabled by different latency envelopes; typically this will be close to the tower for a 5G deployment. In some embodiments, a HetNet Gateway (HNG), which performs control and user plane data aggregation and gateway services, may be the next destination via the backhaul connection; the HNG may disaggregate the different RAT communications to be directed to different RAT cores (i.e., a 2G core, a 3G core, a 4G core, a 5G core and so on). In some embodiments and in certain situations, an HNG may perform virtualization or interworking of aggregated communications such that, e.g., 2G communications may be interworked to 4G IP voice communications and routed through the 4G core. In some embodiments, the HNG may perform virtualization of one or more cores such that the communications may not need to terminate at a RAT-specific core; this feature may be combined with interworking in some embodiments. In some embodiments, no aggregator may be present and the vBBU may directly route communications to each RAT's individual core.

Figure 6:
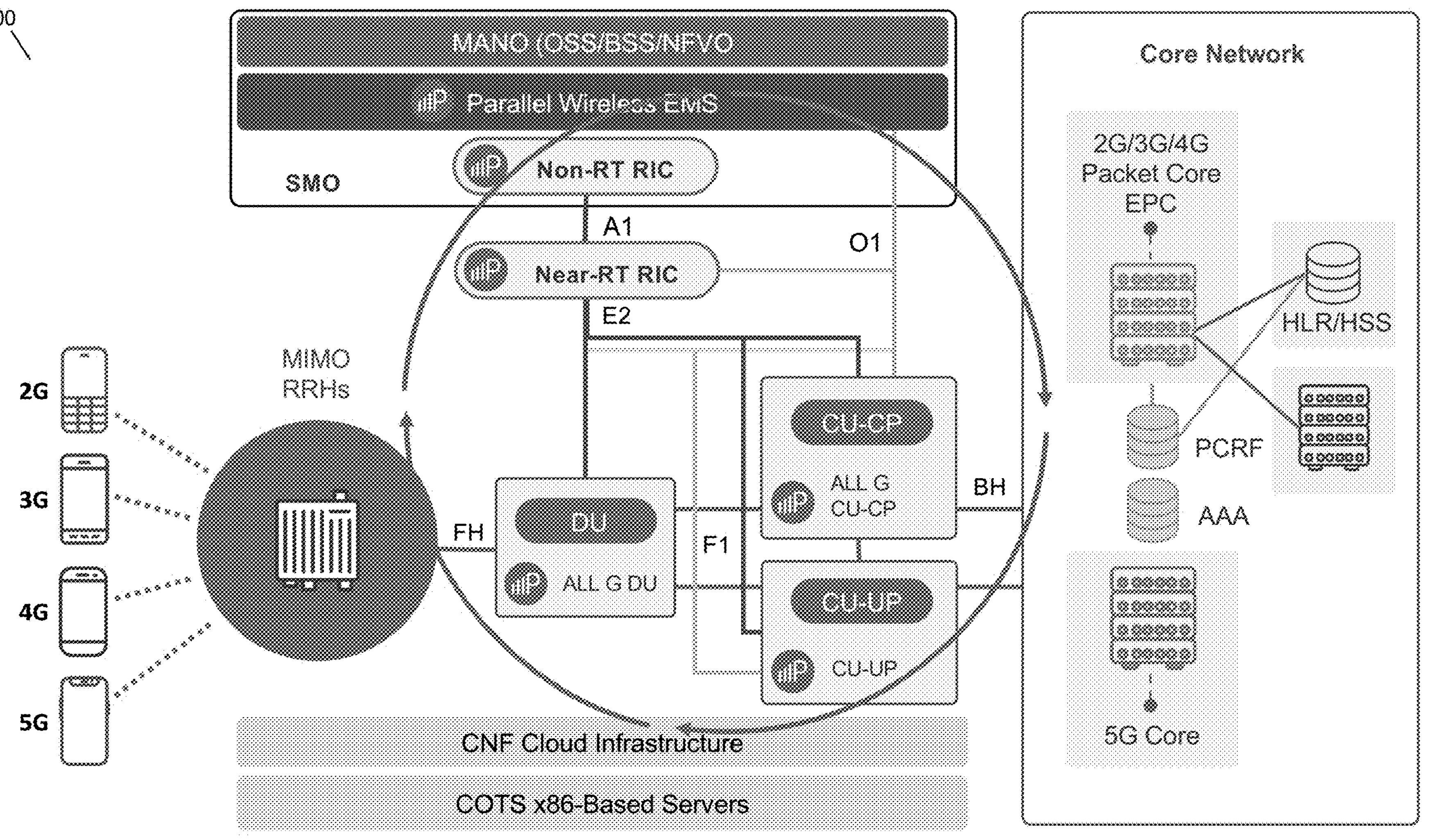
FIG. 6 is a third schematic diagram of a multi-RAT RAN deployment architecture, in accordance with some embodiments.

FIG. 6 is a third schematic diagram of a multi-RAT RAN deployment architecture, in accordance with some embodiments. Multiple generations of UE are shown, connecting to RRHs that are coupled via fronthaul to an all-G Parallel Wireless DU. The all-G DU is capable of interoperating with an all-G CU-CP and an all-G CU-UP. Backhaul may connect to the operator core network, in some embodiments, which may include a 2G/3G/4G packet core, EPC, HLR/HSS, PCRF, AAA, etc., and/or a 5G core. In some embodiments an all-G near-RT RIC is coupled to the all-G DU and all-G CU-UP and all-G CU-CP. Unlike in the prior art, the near-RT RIC is capable of interoperating with not just 5G but also 2G/3G/4G.

The all-G near-RT RIC may perform processing and network adjustments that are appropriate given the RAT. For example, a 4G/5G near-RT RIC performs network adjustments that are intended to operate in the 100 ms latency window. However, for 2G or 3G, these windows may be extended. As well, the all-G near-RT RIC can perform configuration changes that takes into account different network conditions across multiple RATs. For example, if 4G is becoming crowded or if compute is becoming unavailable, admission control, load shedding, or UE RAT reselection may be performed to redirect 4G voice users to use 2G instead of 4G, thereby maintaining performance for users. As well, the non-RT RIC is also changed to be a near-RT RIC, such that the all-G non-RT RIC is capable of performing network adjustments and configuration changes for individual RATs or across RATs similar to the all-G near-RT RIC. In some embodiments, each RAT can be supported using processes, that may be deployed in threads, containers, virtual machines, etc., and that are dedicated to that specific RAT, and, multiple RATs may be supported by combining them on a single architecture or (physical or virtual) machine. In some embodiments, the interfaces between different RAT processes may be standardized such that different RATs can be coordinated with each other, which may involve interworking processes or which may involve supporting a subset of available commands for a RAT, in some embodiments.

Figure 7:
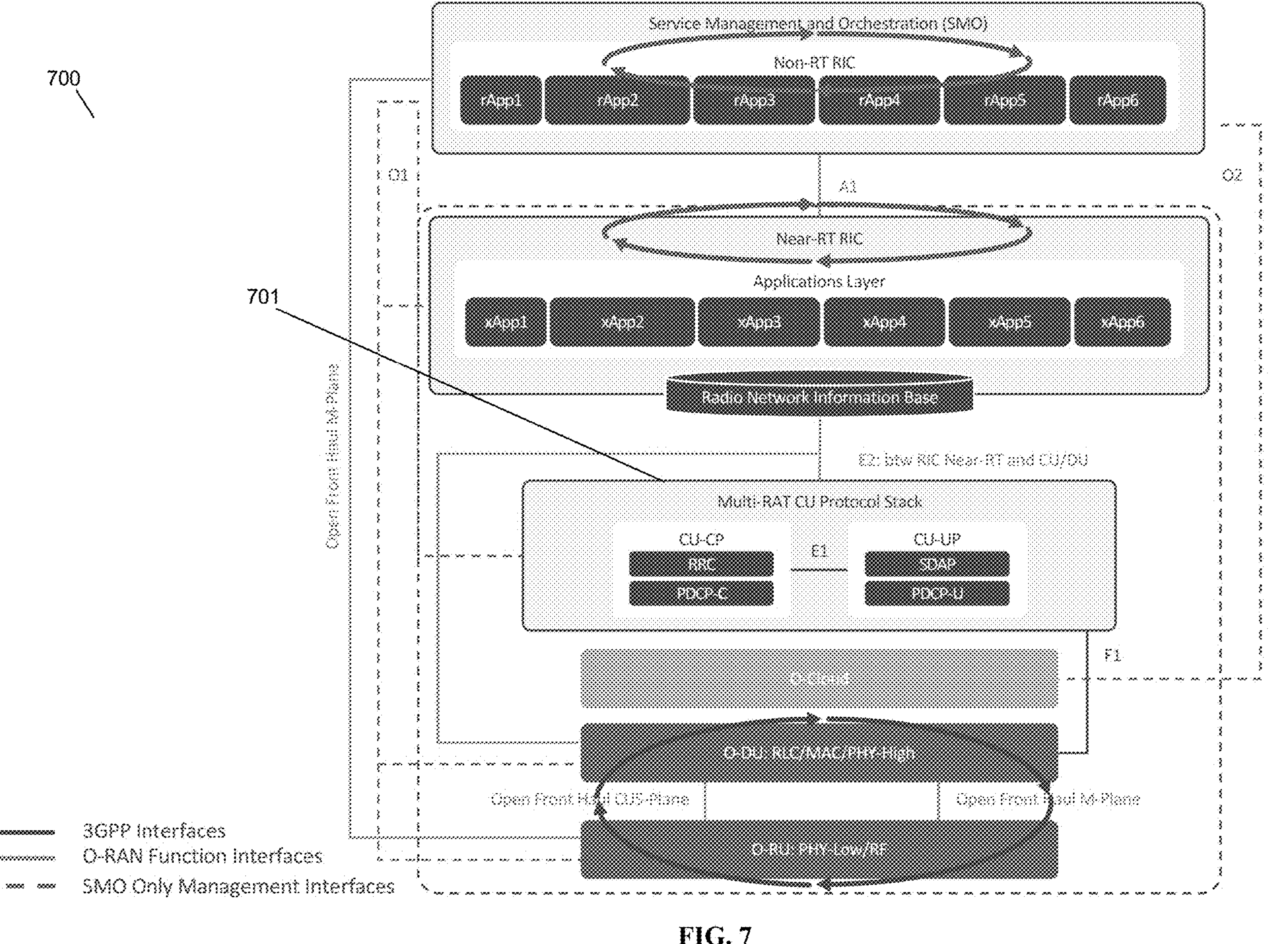
FIG. 7 is a fourth schematic diagram of a multi-RAT RAN deployment architecture, in accordance with some embodiments.

FIG. 7 is a fourth schematic diagram of a multi-RAT RAN deployment architecture, in accordance with some embodiments. The multi-RAT CU protocol stack 701 is configured as shown and enables a multi-RAT CU-CP and multi-RAT CU-UP, performing RRC, PDCP, and SDAP for all-G. As well, some portion of the base station (DU or CU) may be in the cloud or on COTS hardware (O-Cloud), as shown. Coordination with SMO and the all-G near-RT MC and the all-G non-RT MC may be performed using the A1 and O2 function interfaces, as shown and elsewhere as specified by the ORAN and 3GPP interfaces for 4G/5G.

Figure 8:
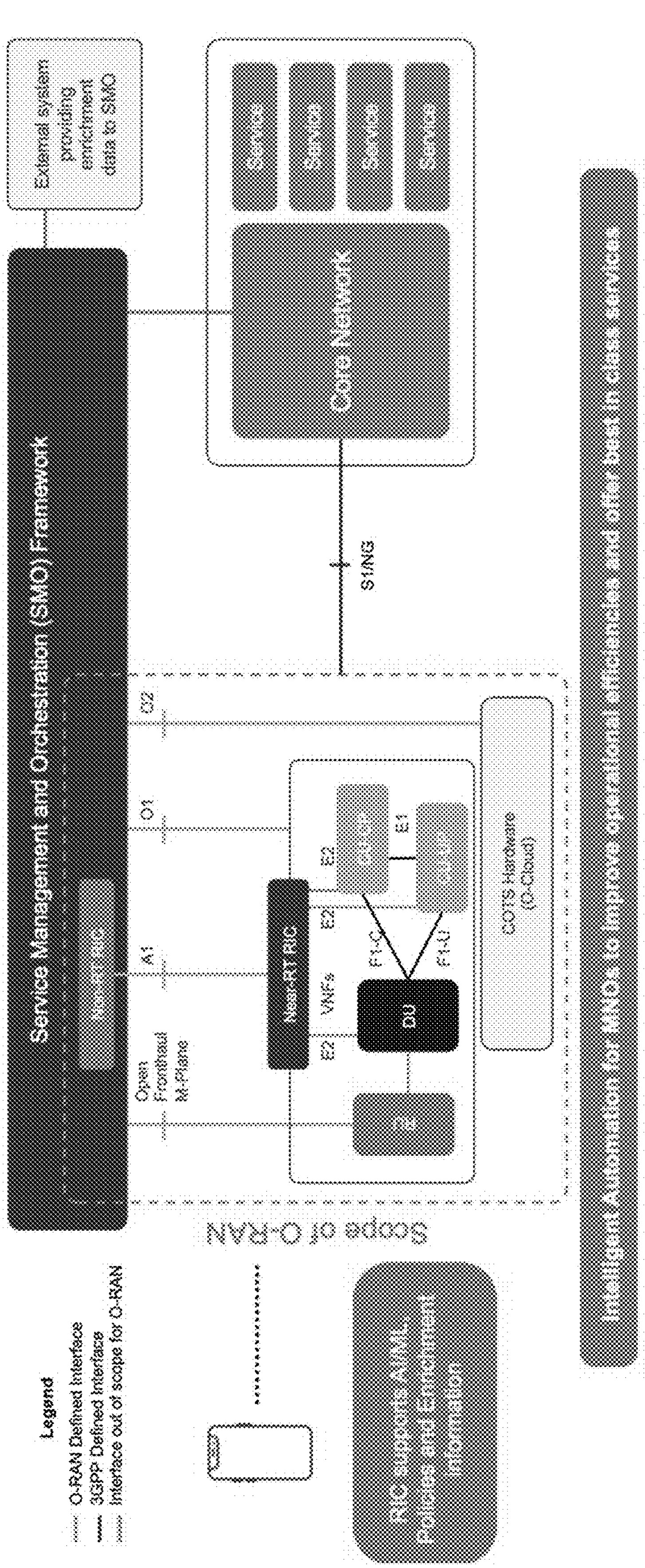
FIG. 8 is a fifth schematic diagram of a multi-RAT RAN deployment architecture, in accordance with some embodiments.

FIG. 8 is a fifth schematic diagram of a multi-RAT RAN deployment architecture, in accordance with some embodiments. This schematic diagram shows the use of the near/non-RT MC to provide AI/ML (artificial intelligence and machine learning) policies and enrichment across Gs. This may also involve an SMO framework that is outside of the RAN, that is interfaced through the non-RT RIC, and may also involve an external system providing enrichment data to the SMO, as well as the core network and any services thereon, in some embodiments. The all-G Non-RT MC serves as the integration point for performing network optimizations and adjustments that take into account any offline processes for AI/ML that involve adjustments that operate outside of the UE latency window (for 4G/5G~100 ms), in some embodiments.

Figure 9:
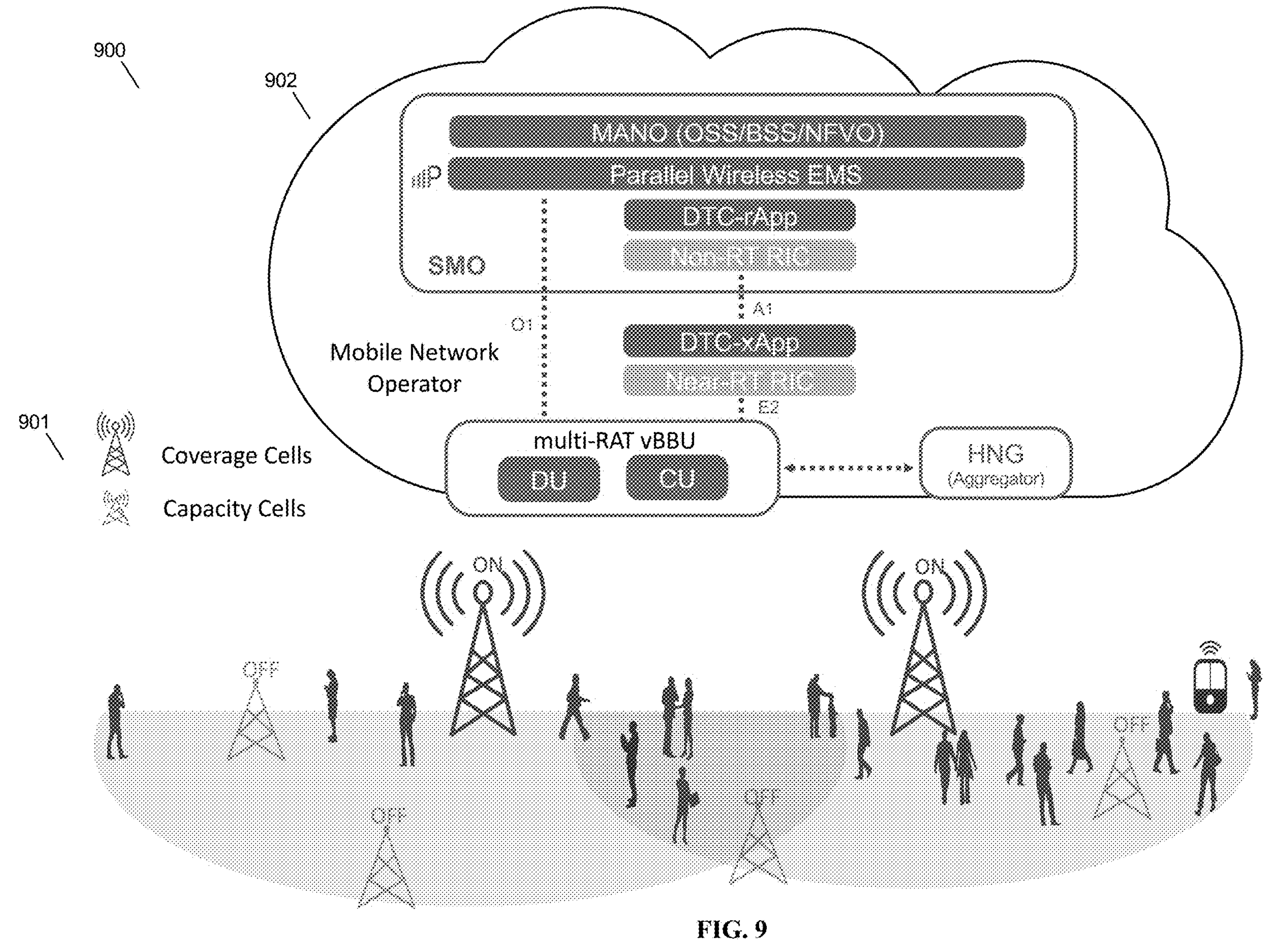
FIG. 9 is a schematic diagram of a multi-RAT RAN deployment in operation, in accordance with some embodiments.

FIG. 9 is a schematic diagram of a multi-RAT RAN deployment in operation, in accordance with some embodiments. Diagram 901 is a schematic diagram of users in proximity to a variety of cells, labeled coverage cells and capacity cells. Coverage cells provide users with a connection to the network that is durable, typically located at a high tower; this type of connection may not, however, enable high bandwidth given the large number of users supported at such cells. Capacity cells support a smaller number of users and use different radio technologies to enable high throughput to users. Capacity and coverage cells are enabled to trade off users as needed to maintain the needs of the network and the users as well. The diagram shows that while there are several capacity cells available in the network, they are all turned off.

Diagram 902 is a schematic diagram of the operator network, in accordance with some embodiments. A multi-RAT vBBU is in communication with a near-RT MC and a non-RT MC, as well as a Parallel Wireless element management system (EMS), which provides the system with awareness about active network nodes, as well as a MANO (OSS/BSS/NFVO) for network operational capabilities. The coverage and capacity cells shown in 901 are in communication with the all-G near-RT MC and all-G non-RT MC. Network functions are managed by applications, called xApps when running on the near-RT MC and rApps when running on the non-RT RIC, and these applications are in communication with each other and aware of the network conditions through information available at the systems on which they are running.

In operation, for some embodiments, for example, when a coverage cell is heavily loaded, an rApp on the non-RT RIC and an xApp on the near-RT RIC coordinate to identify a mitigation, which can include identifying an appropriate capacity cell to activate; activating the cell; and handing over users from the coverage cell to the newly active cell. In another example, in some embodiments, in the case that admission control is identified as causing too many users to be admitted to the network at the same time, throttling may be performed. Monitoring of network load and a subsequent instruction to perform throttling may be initiated at the near-RT MC using an xApp, in some embodiments. This may be a multi-RAT activity and this may involve monitoring of network load for a first RAT and an instruction to perform throttling for a second RAT, in some embodiments.

ADDITIONAL EMBODIMENTS

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods are described in reference to 3GPP, one of skill in the art would understand that these systems and methods could be adapted for use with other wireless standards or versions thereof.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 or ARM microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality. Where the term "all-G" is used herein, it is understood to mean multi-RAT (having at least two radio access technologies).

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A multi-radio access technology (multi-RAT) remote radio head (RRH), comprising:

a first functional radio unit (RU) providing RF and Low PHY functions of a first functional split for a first RAT;

a second functional radio unit (RU) providing RF functions of a second functional split for a second RAT; and a shared radio fronthaul interface in communication with a virtual baseband unit (VBBU) supporting functional split processing for the first RAT and the second RAT, wherein the first functional RU and the second functional RU use the shared radio fronthaul interface to send at least RF layer-processed radio data to the VBBU for remaining processing for the first functional split for the first RAT and for remaining processing for the second functional split for the second RAT.

2. The multi-RAT RRH of claim 1, wherein the first RAT is 4G or 5G, and wherein the radio fronthaul interface is Common Public Radio Interface (CPRI) or Enhanced Common Public Radio Interface (eCPRI).

3. The multi-RAT RRH of claim 1, wherein the second RAT is 2G or 3G, and wherein the radio fronthaul interface is Common Public Radio Interface (CPRI) or Enhanced Common Public Radio Interface (eCPRI).

4. The multi-RAT RRH of claim 1, wherein the first and the second functional RU are colocated on a single physical device and virtualized to operate as separate processes.

5. The multi-RAT RRH of claim 1, wherein the first and the second functional RU are instantiated as virtualized containers.

6. A method of wireless telecommunications, comprising:

by a first functional radio unit (RU), providing RF and Low PHY functions of a first functional split for a first RAT;

by a second functional radio unit (RU), providing RF functions of a second functional split for a second RAT; and sending, by the first functional RU and the second functional RU, on a shared radio fronthaul interface in communication with a virtual baseband unit (VBBU), supporting functional split processing for the first RAT and the second RAT, at least RF layer-processed radio data to the VBBU for remaining processing for the first functional split for the first RAT and for remaining processing for the second functional split for the second RAT.

7. The method of claim 6, wherein the first RAT is 4G or 5G, and wherein the radio fronthaul interface is Common Public Radio Interface (CPRI) or Enhanced Common Public Radio Interface (eCPRI).

8. The method of claim 6, wherein the second RAT is 2G or 3G, and wherein the radio fronthaul interface is Common Public Radio Interface (CPRI) or Enhanced Common Public Radio Interface (eCPRI).

9. The method of claim 6, wherein the first and the second functional RU are colocated on a single physical device and virtualized to operate as separate processes.

10. The method of claim 6, wherein the first and the second functional RU are instantiated as virtualized containers.

11. A non-transitory computer-readable medium containing instructions wireless telecommunications which, when executed, cause a system to perform steps comprising:

by a first functional radio unit (RU), providing RF and Low PHY functions of a first functional split for a first RAT;

by a second functional radio unit (RU), providing RF functions of a second functional split for a second RAT; and sending, by the first functional RU and the second functional RU, on a shared radio fronthaul interface in communication with a virtual baseband unit (VBBU), supporting functional split processing for the first RAT and the second RAT, at least RF layer-processed radio data to the VBBU for remaining processing for the first functional split for the first RAT and for remaining processing for the second functional split for the second RAT.

12. The non-transitory computer-readable medium of claim 11, wherein the first RAT is 4G or 5G, and wherein the radio fronthaul interface is Common Public Radio Interface (CPRI) or Enhanced Common Public Radio Interface (eCPRI).

13. The non-transitory computer-readable medium of claim 11, wherein the second RAT is 2G or 3G, and wherein the radio fronthaul interface is Common Public Radio Interface (CPRI) or Enhanced Common Public Radio Interface (eCPRI).

14. The non-transitory computer-readable medium of claim 11, wherein the first and the second functional RU are colocated on a single physical device and virtualized to operate as separate processes.

15. The non-transitory computer-readable medium of claim 11, wherein the first and the second functional RU are instantiated as virtualized containers.

* * * * *